July 10, 1951 — W. L. MORRISON, JR — 2,559,728
PRESSURE COOKER
Original Filed June 25, 1947
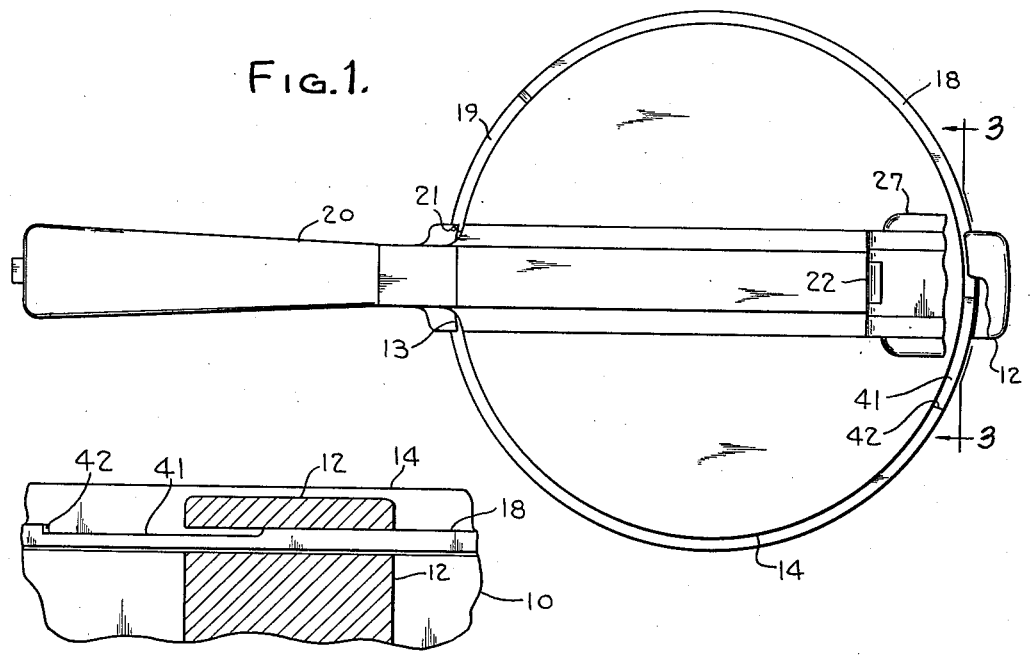
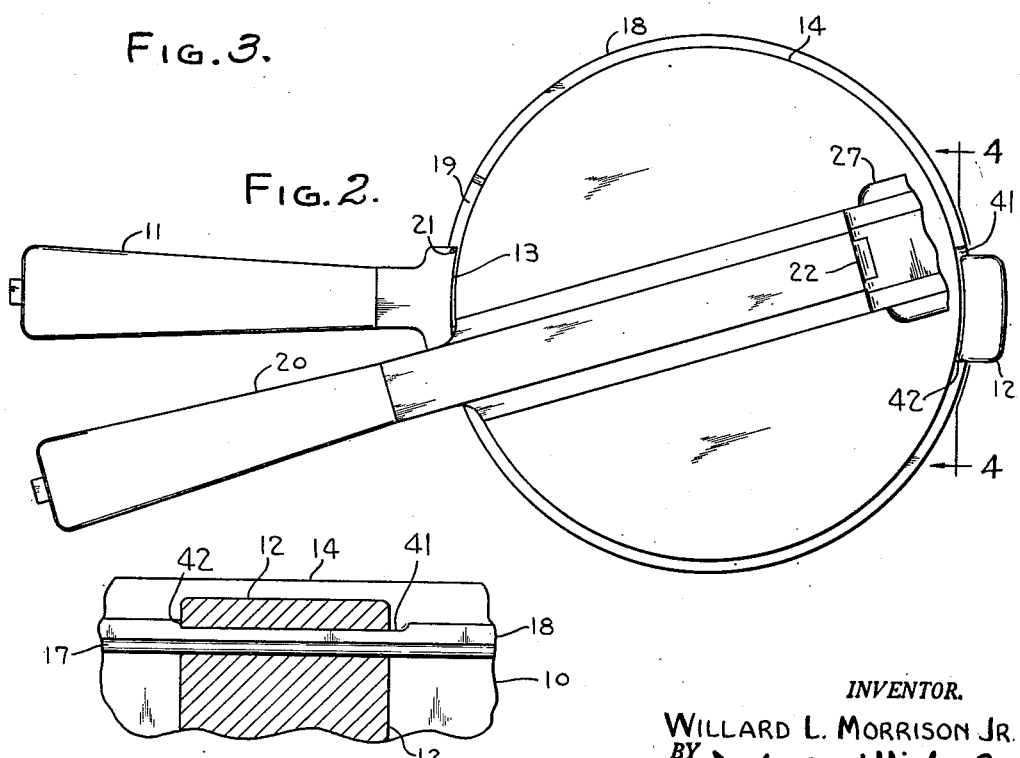
INVENTOR.
WILLARD L. MORRISON JR.
BY 
ATTORNEY Patented July 10, 1951

2,559,728

UNITED STATES PATENT OFFICE 2,559,728

PRESSURE COOKER

Willard L. Morrison, Jr., Chicago, Ill., assignor to West Bend Aluminum Co., West Bend, Wis., a corporation of Wisconsin Original application June 25, 1947, Serial No. 756,911. Divided and this application July 3, 1948, Serial No. 36,891

2 Claims. (Cl. 220—55)

This invention relates to improvements in pressure cookers and pressure regulators therefor. This is a division of the application of Willard L. Morrison, Jr., for "Pressure Cooker," Ser. No. 756,911, filed June 25, 1947, now Patent No. 2,538,583.

In the application of Leonard A. Finch, Ser. No. 676,671, filed June 14, 1946, now Patent No. 2,534,164, dated December 12, 1950, and assigned to West Bend Aluminum Co., the assignee of this application, there is described and claimed a pressure regulator which cannot be closed to regulating position unless the cover has been completely locked, and which will be moved to vent position as the unlocking movement of the cover is started. It is possible, however, by exerting abnormal force, to rapidly complete the unlocking movement of the cover before the pressure has entirely dropped. If this is done the cover will jump up and the steam can escape in such fashion as to injure the hands of the person holding the cooker.

One of the objects of this invention therefore is to provide a pressure cooker the cover of which may not be unlocked until the pressure within the cooker has dropped to within a few ounces of atmospheric pressure eliminating all danger.

To prevent the cover from being unlocked while pressure remains within the cooker, there is provided a recess in the rim of the cover which has a locking edge abuttable against the cover-holding lug to prevent further turning of the cover, if there is sufficient pressure within the cooker to urge the cover upwardly against the cover-holding lug. As the cover is rotated toward unlocked position the recess in the flange comes into alinement with the cover-holding lug. The pressure in the cooker will force the cover upwardly with respect to the lug so that it seats flushly within the recess and the locking edge abuts against the holding lug and prevents further rotation. However, when the pressure has decreased to substantially atmospheric pressure the cover will drop and the lug will become disengaged from the locking edge and the rotation of the cover toward unlocked position may again be resumed.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Fig. 1 is a top plan view of a pressure cooker embodying the present invention, with parts broken away for the sake of clarity in illustrating, showing the cover in fully locked position;

Fig. 2 is a view similar to the view of Fig. 1 but with the cover shown rotated to a position between locked and unlocked position;

Fig. 3 is an enlarged fragmentary sectional view taken on the line 3—3 of Fig. 1; and Fig. 4 is an enlarged fragmentary sectional view taken on the line 4—4 of Fig. 2.

Referring to the drawing by reference numerals, the pressure cooker comprises a container 10 which is provided with the customary handle 11 by which the container may be manipulated. The container 10 is provided at oppositely spaced portions with cover-holding or retaining lugs 12 and 13 which have lips projecting over a rim on the cover. The lug 13 is preferably (but not necessarily) formed at the juncture of the handle 11 with the wall of the container 10. Such position causes the pouring sides of the container to be free from any projections which would interfere with the normal emptying of the contents of the container. The purpose of these lugs 12 and 13 is to limit and restrain the upward movement of the cover member 14 under the influence of pressure above atmosphere generated within the container, and their size is designed to provide adequate holding strength. The details of the cover 14 and the seal and the manner of locking the cover on the container are described in detail in the parent application. The seal is of such character that it is not essential to press or clamp down the cover against the container to form the seal. As pressure greater than the atmosphere is generated within the container the cover will rise until it abuts the lips of the lugs 12 and 13. In order to prevent the cover from rising beyond the limits of the holding lugs 12 and 13 it is provided with a laterally and circumferentially extending rim 18 which fits under the lips of lugs 12 and 13. This rim 18 is provided with an opening 19 adjacent the handle 20. As shown in Figs. 1 and 2 the opening 19 is spaced angularly clockwise from the juncture between the handle 20 and the cover 14. The opening 19 is, of course, long enough to permit the lug 13 to pass therethrough so that the rim 18 may be placed below the lip of lug 13. With this construction, to position the cover 14 on the container the rim 18 opposite handle 20 is slid under the lip of lug 12 while said handle is raised from normal position and then the handles 11 and 20 are relatively rotated and positioned so that opening 19 is in alinement with lug 13 whereupon the handle side of the cover 14 may be lowered so that the lug 13 passes through the opening 19 permitting the rim 18 to rest flush against the upper edge of the container 10 and lie below the lip of said lug. To lock the cover 14 the handle 20 is moved in a clockwise rotation relative to the container 10 until the handles are in substantial alinement as shown in Fig. 1. This causes the rim 18 to pass under the lip of lug 13. A small pin 21 or other like abutment positioned on the upper edge of the container 10 adjacent the juncture of the handle 11 with said container will engage the edge of the rim 18 at the opening 19 to arrest the clockwise motion of the cover when the handles are in substantial alinement. When the cover has been fully rotated from the unlocked position to the fully locked position shown in Fig. 1 the full areas of the lugs 12 and 13 will have a surface-to-surface abutment with the rim 18 of the container when it is moved upwardly by internal pressure and jointly act to keep the cover 14 from rising farther.

The pressure regulator body 27 is pivoted to bracket 22 and is moved to venting position by the initial commencement of the rotation of the cover from completely locked position. However, it is possible by exerting sufficient strength on the respective handles to complete the unlocking of the cover before the pressure within the cooker has reached atmosphere. This is because the escape of steam through the vent is not fast enough to relieve the pressure before the lock is opened. When this occurs, the handle 20 and the cover 14 are swung upwardly about the lug 12 as a fulcrum. This permits steam to escape radially from the cooker at the handle side which in many cases could easily burn or scald the hands of the unwary user. To prevent the cover from being completely unlocked before the pressure has subsided to atmosphere, a safety locking device is incorporated which comprises an elongated recess 41 cut in the top of the rim 18. This recess is slightly longer than the length of the holding lip or lug 12. It has a locking edge 42 at its clockwise or left hand end, as viewed in Figs 1 to 4, inclusive. The recess 41 is spaced, as so viewed, angularly clockwise from that axis of the cover 14 which coincides with the axis of the handle 20 so that when the cover is in the locked position shown in Fig. 1 the counter-clockwise end of the recess 41 is approximately at the center of the lug 12. As the cover 20 is rotated from locked toward unlocked position, the recess 41 will come into alinement with the lug 12, as is shown in Fig. 2 before the opening 19 comes into alinement with the lug 13. If there is any pressure greater than atmosphere in the cooker at such time, the cover 13 will move upwardly so that the locking edge 42 abuts against the edge of the lug 12 and locks the cover against any further rotation. When the pressure within the container has dropped low enough to permit the cover to drop down on the top of the container, such locking engagement will become disengaged and the cover can be moved to unlocked position. It should be noted that when the cover is locked the end of recess 41 forms a bearing point which is offset inwardly from the opposite bearing point. Because of this there is a tendency for the cover to tilt under pressure so that the lower edge of the cover, as shown in Figs. 1 and 2, is raised farther from the top of the container than the opposite side. One advantage of this is that it insures that the locking edge 42 of recess 41 will be raised upwardly and be certain to engage with the edge of the lug 12.

Although only one embodiment of the invention is shown and described herein, it will be understood that this application is intended to cover such changes or modifications as come within the spirit of the invention or scope of the following claims.

I claim:

1. In a pressure cooker, a container having a container handle, a first lug on said container at the juncture of said handle and said container, a second lug on said container opposite said first lug, said lugs each having lips projecting inwardly of said container, a cover for said container having a laterally and circumferentially extending rim insertible under said lips to be engaged thereby to hold said cover on said container, a cover handle on said cover to rotate said cover by relative movement of said handles, a single opening in said rim adjacent said cover handle whereby with said handles spaced said rim may be inserted under said second lug and said opening passed down over said first lug to position said cover on said container, movement of said handles together thereafter bringing said rim beneath both lugs to lock said cover, a recess in the top of said rim substantially opposite said opening, said recess being slightly longer than said second lug and having a locking edge diametrically opposite the central portion of said opening whereby said locking edge will be in engagement with said second lug when said opening is only partially beneath said first lug to prevent unlocking rotation of said cover when there is pressure within said container urging said cover upwardly.

2. A pressure cooker as claimed in claim 1 in which the counter-clockwise ends of said opening and said recess with said opening and recess partially beneath said lugs form oppositely related bearing areas, the common axis of which is offset from the center of the cover whereby pressure exerted on said cover causes said cover to tilt about said common axis to raise said locking edge and insure engagement between said edge and said second lug.

WILLARD L. MORRISON, Jr.

REFERENCES CITED

The following references are of record in the file of this patent:

UNITED STATES PATENTS

| Number | Name | Date |
| --- | --- | --- |
| 836,555 | Birnie | Nov. 20, 1906 |
| 1,369,249 | Kroupa | Feb. 22, 1921 |
| 1,887,700 | Stevens | Nov. 15, 1932 |
| 2,101,756 | Saunders | Dec. 7, 1937 |
| 2,164,450 | Eshbaugh et al. | July 4, 1939 |
| 2,164,478 | Smith | July 4, 1939 |
| 2,198,125 | Nelson | Apr. 23, 1940 |
| 2,201,314 | Illsley | May 21, 1940 |
| 2,218,188 | Wittenberg | Oct. 15, 1940 |

FOREIGN PATENTS

| Number | Country | Date |
| --- | --- | --- |
| 309,308 | Germany | Nov. 13, 1918 |